US012340704B2

(12) United States Patent
Nakazawa et al.

(10) Patent No.: US 12,340,704 B2
(45) Date of Patent: Jun. 24, 2025

(54) INFORMATION PROCESSING DEVICE, LANDING SUITABILITY DETERMINING METHOD, AND NON-TRANSITORY COMPUTER READABLE MEMORY

(71) Applicant: RAKUTEN GROUP, INC., Tokyo (JP)

(72) Inventors: Mitsuru Nakazawa, Tokyo (JP); Jun Takizawa, Chino (JP)

(73) Assignee: Rakuten Group, Inc., Tokyo (JP)

( * ) Notice: Subject to any disclaimer, the term of this patent is extended or adjusted under 35 U.S.C. 154(b) by 190 days.

(21) Appl. No.: 18/163,419

(22) Filed: Feb. 2, 2023

(65) Prior Publication Data

US 2023/0260410 A1    Aug. 17, 2023

(30) Foreign Application Priority Data

Feb. 16, 2022    (JP) ................. 2022-022131

(51) Int. Cl.
| | |
|---|---|
| G08G 5/50 | (2025.01) |
| G08G 5/54 | (2025.01) |
| G08G 5/55 | (2025.01) |
| G08G 5/57 | (2025.01) |
| G08G 5/59 | (2025.01) |
| G08G 5/74 | (2025.01) |
| G08G 5/76 | (2025.01) |

(52) U.S. Cl.
CPC ............. *G08G 5/54* (2025.01); *G08G 5/55* (2025.01); *G08G 5/57* (2025.01); *G08G 5/59* (2025.01); *G08G 5/74* (2025.01); *G08G 5/76* (2025.01)

(58) Field of Classification Search
CPC ...... G08G 5/025; G08G 5/006; G08G 5/0069; G08G 5/0086; G08G 5/0091
USPC ............................................................ 701/16
See application file for complete search history.

(56) References Cited

U.S. PATENT DOCUMENTS

| | | | |
|---|---|---|---|
| 11,493,938 B1 * | 11/2022 | Harris ................ | G05D 1/654 |
| 2016/0093225 A1 * | 3/2016 | Williams ............. | G01C 21/20 |
| | | | 701/17 |
| 2016/0253908 A1 * | 9/2016 | Chambers ........... | G08G 5/006 |
| | | | 701/2 |
| 2017/0083979 A1 * | 3/2017 | Winn ................ | G06Q 20/3224 |
| 2018/0158344 A1 * | 6/2018 | Cutler ................ | G08G 5/025 |
| 2020/0201360 A1 * | 6/2020 | Blonder ............. | G08G 5/0086 |
| 2021/0312823 A1 * | 10/2021 | Browne .............. | G08G 5/0013 |
| 2021/0319705 A1 | 10/2021 | Furumoto | |

FOREIGN PATENT DOCUMENTS

JP    2019-64280 A    4/2019

* cited by examiner

*Primary Examiner* — Mahmoud S Ismail
(74) *Attorney, Agent, or Firm* — Sughrue Mion, PLLC

(57) ABSTRACT

The information processing device detects a feature existing in the peripheral area of a landing candidate place of the UAV 1, estimates a degree of influence on a landing due to downwardly-blowing wind generated during the landing of the UAV 1, hitting and bouncing off the feature, which is the degree of influence at the landing candidate place, and determines whether or not the landing candidate place is suitable for landing on the basis of the estimated degree of influence.

11 Claims, 10 Drawing Sheets

FIG. 7

| FEATURE ATTRIBUTE | EASE OF AIRFLOW (pt) |
|---|---|
| WALL | 0pt |
| WIRE MESH FENCE | 8pt |
| BARRIER | 6pt |
| TREE | 5pt |
| ARTICLE | 3pt |
| MOVING BODY | 3pt |
| RUBBLE | 5pt |
| ROAD | 10pt |
| ... | ... |

FIG. 8

| BLy | | | | | | BLx | | |
|---|---|---|---|---|---|---|---|---|
| 5pt | 5pt | 10pt | 10pt | 10pt | 10pt | 10pt | 10pt | 10pt |
| 5pt | 5pt | 10pt | 10pt | 10pt | 10pt | 10pt | 10pt | 10pt |
| 0pt | 0pt | | | | | | 10pt | 10pt |
| 0pt | 0pt | | | | | | 10pt | 10pt |
| 0pt | 0pt | \multicolumn{5}{c}{LANDING CANDIDATE PLACE (1)} | | 10pt | 10pt |
| 0pt | 0pt | | | | | | 10pt | 10pt |
| 0pt | 0pt | | | | | | 10pt | 10pt |
| 0pt | 0pt | 10pt | 10pt | 10pt | 10pt | 10pt | 10pt | 10pt |
| 0pt | 0pt | 10pt | 10pt | 10pt | 10pt | 10pt | 10pt | 10pt |

INFORMATION PROCESSING DEVICE, LANDING SUITABILITY DETERMINING METHOD, AND NON-TRANSITORY COMPUTER READABLE MEMORY

CROSS REFERENCE TO RELATED APPLICATION

This application claims priority from Japanese Patent Application No. 2022-022131 which was filed on Feb. 16, 2022, the disclosure of which is herein incorporated by reference in its entirety.

TECHNICAL FIELD

One or more embodiments of the present invention relates to a technical field of a method or the like for enabling reduction of an influence of ground effect at the time of landing of an unmanned aerial vehicle.

RELATED ART

When an unmanned aerial vehicle such as a drone lands, it is sometimes difficult to control the landing of the unmanned aerial vehicle due to an influence of wind (downwash) blowing down from a rotating propeller of the unmanned aerial vehicle, hitting and bouncing off the ground at a landing place. This influence is known as ground effect. JP 2019-64280 A discloses a technique for determining an area suitable for landing by determining whether or not a landing assumed area has a larger area than a projected area of a vehicle and determining whether or not the landing assumed area is a horizontal or nearly horizontal plane in order to reduce the influence of ground effect at the time of landing of the vehicle.

However, the above-described downwardly-blowing wind sometimes hits and bounces off not only the ground at the landing place but also a feature existing in a peripheral area of the landing place. As a result, even if the landing place is horizontal, there is an issue in that it is difficult to control the landing of the unmanned aerial vehicle due to the influence of the downwardly-blowing wind hitting and bouncing off the feature existing in the peripheral area of the landing place.

Therefore, one or more embodiments of the present invention are to providing an information processing device, a landing suitability determining method, and a non-transitory computer readable memory that enable selection of a suitable landing place in consideration of an influence of downwardly-blowing wind hitting and bouncing off a feature.

SUMMARY

In response to the above issue, an information processing device includes: at least one memory configured to store program code; and at least one processor configured to access the program code and operate as instructed by the program code. The program code includes: detection code configured to cause the at least one processor to detect a feature existing in a peripheral area of a landing candidate place of an unmanned aerial vehicle; estimation code configured to cause the at least one processor to estimate a degree of influence on landing due to downwardly-blowing wind generated during landing of the unmanned aerial vehicle, hitting and bouncing off the feature, the degree of influence being a degree of influence at the landing candidate place; and determination code configured to cause the at least one processor to determine whether or not the landing candidate place is suitable for landing on the basis of the estimated degree of influence.

The estimation code may cause the at least one processor to estimate the degree of influence on the basis of data indicating relationships between feature attributes and a corresponding ease or difficulty of airflow of a feature; and an attribute of the detected feature.

The estimation code may cause the at least one processor to identify the ease or the difficulty of airflow of the feature for each of a plurality of first sections obtained by virtually subdividing the peripheral area of the landing candidate place, and to estimate the degree of influence on the basis of the ease or the difficulty of airflow of each section.

The estimation code may cause the at least one processor to estimate the degree of influence on the basis of at least any one of a three-dimensional size and a three-dimensional shape of the detected feature, in addition to the attribute of the detected feature.

The landing candidate place may be a place obtained by virtually subdividing a landing candidate area into predetermined second sections.

The estimation code may cause the at least one processor to estimate the degree of influence for each of a plurality of the landing candidate places, and the determination code may cause the at least one processor to determine whether or not each of the landing candidate places is suitable for landing on the basis of the degree of influence of each of the landing candidate places.

The program code may further include identification code configured to cause the at least one processor to identify, as the landing candidate area, a flat area having at least no obstacle and a predetermined size or more from a predetermined landing target area.

The program code may further include identification code configured to cause the at least one processor to identify, as the landing candidate area, a flat area having at least no obstacle and a predetermined size or more, and further having an attribute of a ground surface suitable for landing from a predetermined landing target area.

The detection code may cause the at least one processor to detect the feature existing in the peripheral area of the landing candidate place on the basis of sensing information obtained by sensing the peripheral area of the landing candidate place by the unmanned aerial vehicle.

A landing suitability determining method executed by one or a plurality of computers, includes: detecting a feature existing in a peripheral area of a landing candidate place of an unmanned aerial vehicle; estimating a degree of influence on landing due to downwardly-blowing wind generated during landing of the unmanned aerial vehicle, hitting and bouncing off the feature, the degree of influence being a degree of influence at the landing candidate place; and determining whether or not the landing candidate place is suitable for landing on the basis of the estimated degree of influence.

A non-transitory computer readable memory has stored thereon a program configured to cause a computer to: detect a feature existing in a peripheral area of a landing candidate place of an unmanned aerial vehicle; estimate a degree of influence on landing due to downwardly-blowing wind generated during landing of the unmanned aerial vehicle, hitting and bouncing off the feature, the degree of influence being a degree of influence at the landing candidate place;

and determine whether or not the landing candidate place is suitable for landing on the basis of the estimated degree of influence.

BRIEF DESCRIPTION OF THE DRAWINGS

FIG. 7 is a table-format diagram illustrating an example of data indicating relationships between feature attributes and a corresponding ease of airflow of a feature.

FIG. 8 is a conceptual diagram illustrating an example of eases of airflow of features existing in a peripheral area of the landing candidate place (1).

DETAILED DESCRIPTION

Hereinafter, one or more embodiments of the present invention will be described with reference to the drawings. Incidentally, the following embodiment is an embodiment in a case where the present invention is applied to a flight management system that causes an unmanned aerial vehicle to fly for a predetermined purpose. Examples of the predetermined purpose include transportation (delivery), surveying, photographing, inspection, and monitoring.

[1. Configuration and Operation Overview of Flight Management System S]

Figure 1:
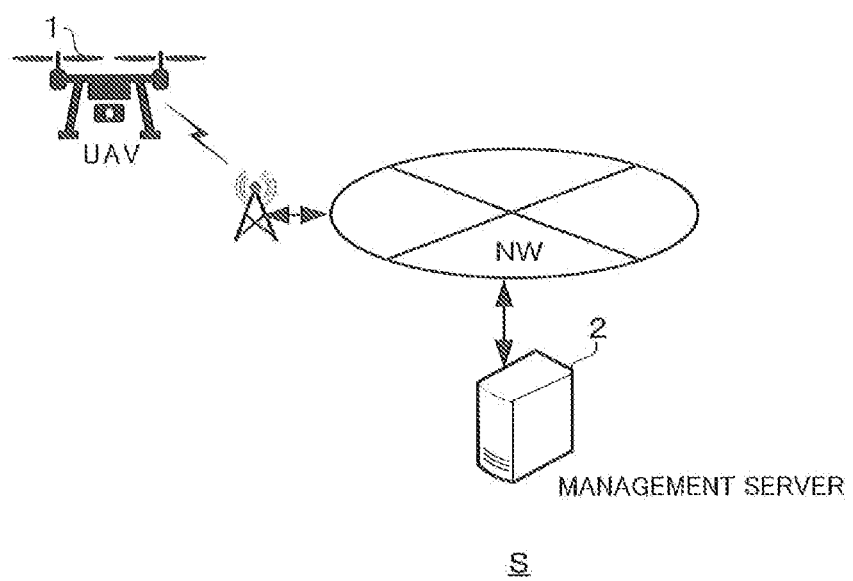
FIG. 1 is a diagram illustrating a schematic configuration example of a flight management system S.

First, a configuration and an operation overview of a flight management system S according to the present embodiment will be described with reference to FIG. 1. FIG. 1 is a diagram illustrating a schematic configuration example of the flight management system S. As illustrated in FIG. 1, the flight management system S includes an unmanned aerial vehicle (hereinafter, referred to as a "UAV (Unmanned Aerial Vehicle)") 1 and a management server 2 (an example of an information processing device), which can be connected to a communication network NW. Here, the communication network NW includes, for example, the Internet, a mobile communication network, a radio base station thereof, and the like. The UAV 1 is also called a drone or a multi-copter. The UAV 1 is capable of flying from the ground according to remote control by an operator or autonomously flying in the air, toward a landing target area. The management server 2 is a server that manages the landing target area and the UAV 1.

The flight management system S according to the present embodiment can select (determine), as a landing place of the UAV 1, a place that is less affected (in other words, where landing control is not difficult) by wind blowing down from a rotating propeller of the UAV 1, hitting and bouncing off one or more features existing in a peripheral area (peripheral area of a landing candidate place to be described later). As a result, the UAV 1 can be stably landed even in a place where there is no take-off/landing facility (take-off/landing port) prepared in advance. Here, the landing place is selected from, for example, a site of a house, a parking lot, a park, a site of a distribution warehouse, a rooftop of a building, a vicinity of a disaster-stricken building, or an adjacent area of a cliff, a bank, and the like. The feature is an object that exists particularly in contact with the ground, such as a natural object or an artificial object, and may be a planar object or a three-dimensional object. Examples of an attribute (in other words, a type) of the feature include a building wall, a wall (e.g., a block wall), a fence (e.g., a wire mesh fence), a barrier (e.g., a hedge and a bamboo fence), a tree, an article (e.g., items placed on a pallet), a moving body such as an automobile or a bicycle, rubble, and a road. Moreover, the feature can also be referred to as an obstacle. Incidentally, in the present specification, the ground may include a rooftop surface of a building.

[1-1. Configuration and Function of UAV 1]

Figure 2:
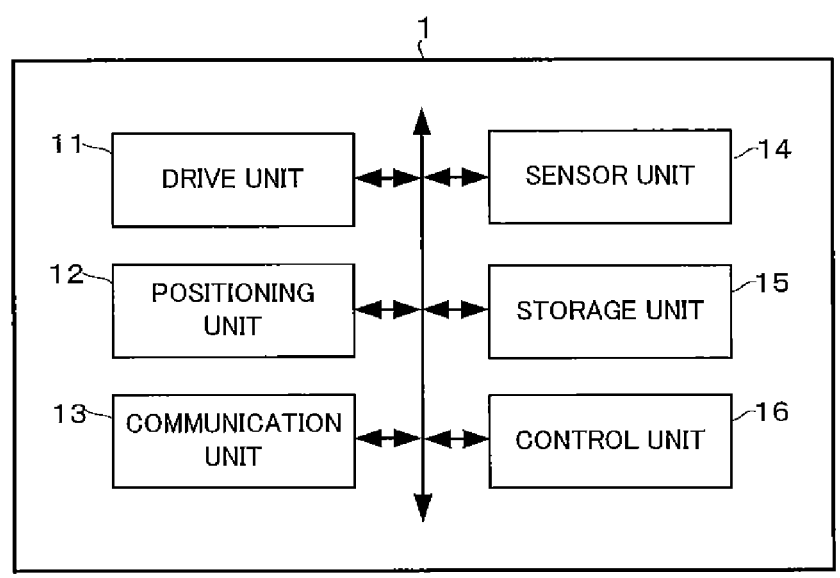
FIG. 2 is a diagram illustrating a schematic configuration example of an UAV 1.

Next, a configuration and a function of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a communication unit 13, a sensor unit 14, a storage unit 15, a control unit 16 (an example of a computer), and the like. Furthermore, the UAV 1 includes a battery (not illustrated) that supplies power to each unit of the UAV 1, and a rotor (propeller) that is a horizontal rotary wing. Incidentally, the UAV 1 may include a holding mechanism or the like for holding an article to be transported. Such a holding mechanism may be provided with a storage portion for storing the article. In this case, for example, an opening/closing door is provided on a lower surface of the storage portion. Incidentally, the holding mechanism may include a wire and a reel (winch) for feeding or winding the wire.

The drive unit 11 includes a motor, a rotation shaft, and the like. The drive unit 11 rotates a plurality of rotors by the motor, the rotation shaft, and the like that are driven in accordance with a control signal output from the control unit 16. The positioning unit 12 includes a radio wave receiver, an altitude sensor, and the like. The positioning unit 12 receives, for example, a radio wave transmitted from a GNSS (Global Navigation Satellite System) satellite by the radio wave receiver, and detects a current position (latitude and longitude) of the UAV 1 in a horizontal direction on the basis of the radio wave. Incidentally, the current position of the UAV 1 in the horizontal direction may be corrected on the basis of an image captured by a camera of the sensor unit 14. Moreover, the current position of the UAV 1 in the horizontal direction may be corrected by an RTK (Real Time Kinematic) method using the radio wave received by a reference station (reference station capable of communicating with the UAV 1) whose installation position is identified. Position information indicating the current position detected by the positioning unit 12 is output to the control unit 16. Furthermore, the positioning unit 12 may detect a current position (altitude) of the UAV 1 in a vertical direction by the altitude sensor such as an atmospheric pressure sensor. In this case, the position information includes altitude information indicating the altitude of the UAV 1.

The communication unit 13 has a wireless communication function and controls communication performed via the communication network NW. The sensor unit 14 includes various sensors used for flight control of the UAV 1. Examples of the various sensors include an optical sensor, a weather sensor, a triaxial angular velocity sensor, a triaxial acceleration sensor, a geomagnetic sensor, and the like. The optical sensor includes, for example, a camera (for example, an RGB camera and a depth camera), and continuously senses a real space within a sensing range (for example, a range that falls within an angle of view of the camera). Here, the sensing means, for example, measuring, imaging, or sensing some amount (for example, a physical quantity).

Moreover, the optical sensor may include a LiDAR (Light Detection and Ranging, or Laser Imaging Detection and Ranging) sensor that measures a shape of the feature or a distance to the feature. Moreover, the optical sensor may include a thermo sensor that contactlessly senses a temperature (infrared ray) of the ground including the feature. Moreover, the weather sensor is a sensor for sensing weather such as a wind speed (wind strength) and a wind direction in a surrounding environment of the UAV 1. Sensing information obtained by the sensing by the sensor unit 14 is output to the control unit 16. The sensing information includes, for example, at least any one of an RGB image, a depth image, a distance image, and a thermo image sensed by the optical sensor. Moreover, the sensing information may include weather information (for example, the wind speed and the wind direction) sensed by the weather sensor.

The storage unit 15 includes a nonvolatile memory or the like, and stores various programs and data. Moreover, the storage unit 15 stores a vehicle ID (identification information) for identifying the UAV 1. The control unit 16 includes at least one CPU (Central Processing Unit), a ROM (Read Only Memory), a RAM (Random Access Memory), and the like, and executes various types of control according to a program stored in the ROM (or the storage unit 15). For example, the control unit 16 performs flight control to cause the UAV 1 to fly toward the landing target area. In this flight control, a rotation speed of the rotors, and a position, an attitude, and a traveling direction of the UAV 1 are controlled using the position information acquired from the positioning unit 12, the sensing information acquired from the sensor unit 14, landing target area information indicating the landing target area, and the like. As a result, the UAV 1 can autonomously move to the sky above the landing target area.

The landing target area information includes, for example, a center position (latitude and longitude) of the landing target area and a size of the landing target area. Here, the size of the landing target area is represented by, for example, an area with a radius of several tens of meters based on the center position, or an area of several tens of meters in length×several tens of meters in width. The landing target area information may be set at a departure point (flight start point) in the UAV 1, or may be set by being transmitted from the management server 2. Incidentally, during the flight of the UAV 1, the position information of the UAV 1 and the vehicle ID of the UAV 1 are sequentially transmitted to the management server 2 by the communication unit 13.

When the UAV 1 arrives in the sky above the landing target area (for example, an altitude of 30 m), the control unit 16 causes the sensor unit 14 to perform sensing (for example, as a first stage, long-distance sensing) of a range including the landing target area from the sky, and acquires sensing information (hereinafter, referred to as "first sensing information") obtained by the sensing. Such sensing may be continuously performed in time series. The first sensing information obtained by sensing the range including the landing target area by the sensor unit 14 is transmitted to the management server 2 by the communication unit 13 together with the position information of the UAV 1 and the vehicle ID of the UAV 1.

When receiving, via the communication unit 13, landing candidate area information indicating a landing candidate area (that is, a landing candidate area included in the landing target area) identified from the landing target area by the management server 2 on the basis of the first sensing information, the control unit 16 controls flight to the landing candidate area. Here, the landing candidate area information includes, for example, a center position (latitude and longitude) of the landing candidate area and a size of the landing candidate area. The size of the landing candidate area is represented in the same manner as the landing target area. Thereafter, when the UAV 1 lowers the altitude after receiving the landing candidate area information and arrives in the sky above the landing candidate area (for example, an altitude of 10 m), the control unit 16 causes the sensor unit 14 to perform sensing (for example, as a second stage, short-distance sensing) of a range including the landing candidate area from the sky, and acquires sensing information (hereinafter, referred to as "second sensing information") obtained by the sensing. Such sensing may be continuously performed in time series. The second sensing information obtained by sensing the range including the landing candidate area by the sensor unit 14 is transmitted to the management server 2 by the communication unit 13 together with the position information of the UAV 1 and the vehicle ID of the UAV 1.

Thereafter, when receiving, via the communication unit 13, landing place information indicating a landing place finally selected by the management server 2 on the basis of the second sensing information, the control unit 16 controls landing at the landing place. Such landing place information includes, for example, a position (latitude and longitude) of the landing place and a two-dimensional size (for example, length y m×width×m) of the landing place. In the landing control, the rotation speed of the rotors, and the position, the attitude, and the traveling direction of the UAV 1 are controlled using the landing place information, the position information acquired from the positioning unit 12, the sensing information acquired from the sensor unit 14, and the like.

Here, the control unit 16 may perform the landing control by a landing method according to arrangement of obstacle (for example, the feature that may obstruct landing) in a peripheral area of the landing place. For example, in a case where there are obstacles around the landing place (for example, in the four surrounding directions), the control unit 16 causes the UAV 1 to descend vertically from directly above the landing place. On the other hand, in a case where obstacles exist unevenly in any of the directions in the periphery of the landing place (e.g., there are obstacles only in a certain direction in the periphery of the landing place), the control unit 16 causes the UAV 1 to descend obliquely toward the landing place from a direction in which the obstacles do not exist. At this time, the control unit 16 may cause the UAV 1 to descend at accelerated speed (i.e., the control unit 16 may accelerate the speed of the UAV1 to descend) so that the UAV 1 is not fanned by wind for a long time (in order to avoid being affected by wind agitation for a long time). The landing method according to the arrangement of the obstacle may be determined by the control unit 16 or may be determined by the management server 2. In a case where the landing method is determined by the management server 2, landing method information indicating the landing method according to the arrangement of the obstacle is transmitted from the management server 2 to the UAV 1 together with the landing place information. In this case, the control unit 16 performs the landing control by the landing method according to the arrangement of the obstacle in the periphery of the landing place on the basis of the received landing method information.

Incidentally, the landing of the UAV 1 by the landing control may include the UAV 1 contacting the ground of the landing place, and the UAV 1 stopping (hovering) at a position (in the air) separate from the ground of the landing place by about several tens of centimeters to 2 m in the vertical direction. The latter assumes a case where the UAV 1 is used for transporting an article. In this case, the article is released when separated from the holding mechanism of the UAV 1 in the hovering state, or the article is released when the opening/closing door of the storage portion of the holding mechanism is opened. Thereafter, the UAV 1 returns without contacting the ground of the landing place. Moreover, in this case, by feeding the wire by the reel of the UAV 1, the article may be released when the article or the storage portion thereof is lowered in the vertical direction and comes into contact with the ground.

[1-2. Configuration and Function of Management Server 2]

Figure 3:
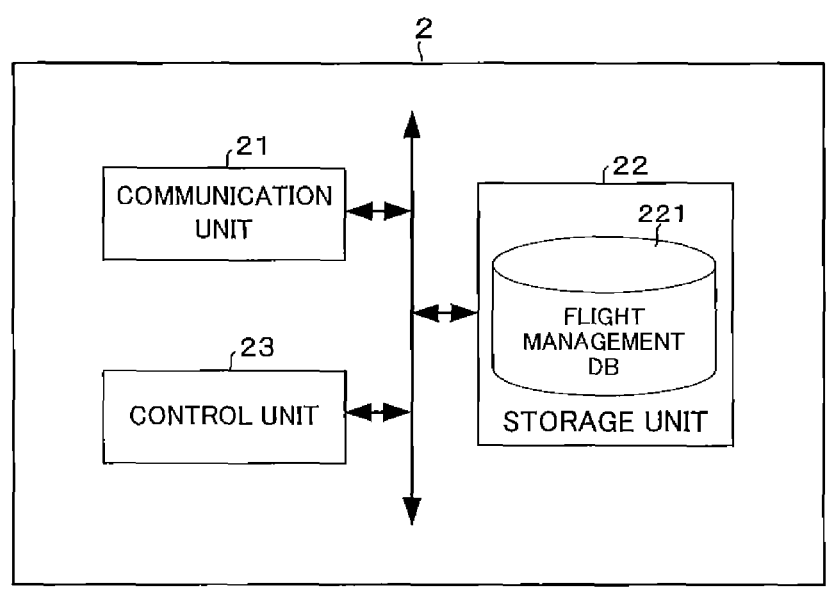
FIG. 3 is a diagram illustrating a schematic configuration example of a management server 2.

Next, a configuration and a function of the management server 2 will be described with reference to FIG. 3. FIG. 3 is a diagram illustrating a schematic configuration example of the management server 2. As illustrated in FIG. 3, the management server 2 includes a communication unit 21, a storage unit 22, a control unit 23 (an example of a computer), and the like. The communication unit 21 controls communication performed via the communication network NW. The sensing information, the position information, and the vehicle ID transmitted from the UAV 1 are received by the communication unit 21. The management server 2 can recognize the current position of the UAV 1 from the position information of the UAV 1. The storage unit 22 includes, for example, a hard disk drive or the like, and stores various programs and data. The programs may be stored in a non-transitory computer readable memory. Moreover, in the storage unit 22, a flight management database 221 or the like is constructed. The flight management database 221 is a database for managing information related to the flight of the UAV 1. In the flight management database 221, the landing target area information, the landing place information, vehicle information, and the like are stored (registered) in association with one another. Here, the vehicle information includes the vehicle ID, a vehicle size, and the like of the UAV 1 that is caused to fly to the landing target area. The vehicle size is, for example, a two-dimensional size of the UAV 1 (length y m×width×m). Incidentally, the flight management database 221 may store the landing method information.

The control unit 23 includes at least one CPU, a ROM, a RAM, and the like, and performs various processes according to the programs (program code) stored in the ROM or the storage unit 22 or the non-transitory computer readable memory. The CPU (an example of processor) is configured to access the program code stored in the ROM or the storage unit 22 or the non-transitory computer readable memory and operate as instructed by the program code. The program code includes: detection code configured to cause the CPU to detect one or more features existing in a peripheral area of a landing candidate place of the UAV 1; estimation code configured to cause the CPU to estimate a degree of influence on landing due to downwardly-blowing wind generated during landing of the UAV 1, hitting and bouncing off the feature(s), the degree of influence being a degree of influence at the landing candidate place; and determination code configured to cause the CPU to determine whether or not the landing candidate place is suitable for landing on the basis of the estimated degree of influence. The program code may further include identification code configured to cause the CPU to identify, as the landing candidate area, a flat area having at least no obstacle and a predetermined size or more from a predetermined landing target area. The program code may further include identification code configured to cause to identify, as the landing candidate area, a flat area having at least no obstacle and a predetermined size or more, and further having an attribute of a ground surface suitable for landing from a predetermined landing target area.

Figure 4:
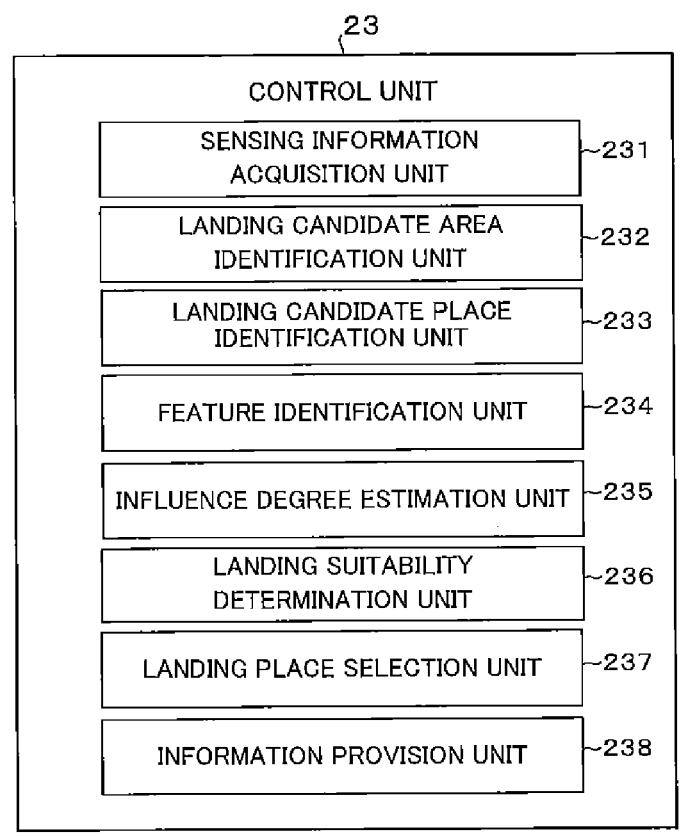
FIG. 4 is a diagram illustrating an example of a functional block in a control unit 23.

FIG. 4 is a diagram illustrating an example of a functional block in the control unit 23. For example, in accordance with the program (program code group) stored in the ROM or the storage unit 22 or the non-transitory computer readable memory, the control unit 23 functions as a sensing information acquisition unit 231, a landing candidate area identification unit 232, a landing candidate place identification unit 233, a feature identification unit 234, an influence degree estimation unit 235, a landing suitability determination unit 236, a landing place selection unit 237, an information provision unit 238, and the like as illustrated in FIG. 4.

The sensing information acquisition unit 231 acquires the first sensing information obtained by the UAV 1 sensing the range including the landing target area, from the UAV 1 via the communication unit 21. Moreover, the sensing information acquisition unit 231 acquires the second sensing information obtained by the UAV 1 sensing the range including the landing candidate area, from the UAV 1 via the communication unit 21. Here, the range including the landing candidate area includes a peripheral area of a landing candidate place to be described later.

On the basis of the first sensing information acquired by the sensing information acquisition unit 231, the landing candidate area identification unit 232 identifies, as the landing candidate area, a flat area (area having flatness) having at least no obstacle and a predetermined size or more from a predetermined landing target area (for example, length 50 m×width 50 m). By narrowing down the landing target area in advance as described above, the amount of computation for selecting the landing place can be reduced without unnecessary search. The predetermined size is set to a size larger than at least the vehicle size of the UAV 1. The flat area is, for example, an area in which a gradient (inclination with respect to a horizontal plane) is equal to or less than a threshold. It suffices if the flat area is identified from a three-dimensional shape of the landing target area. The three-dimensional shape of the landing target area can be identified, for example, by performing SLAM (Simultaneous Localization and Mapping) processing on the first sensing information. Incidentally, a position of each point in the landing candidate area can be identified on the basis of, for example, the position information of the UAV 1 that has transmitted the first sensing information, and a distance from the UAV 1 to each point.

Moreover, the landing candidate area identification unit 232 may identify, as the landing candidate area, the flat area having no obstacle and the predetermined size or more, and further having an attribute of a ground surface suitable for landing from the predetermined landing target area. Here, the ground surface is a surface of the landing target area as viewed from above, and is distinguished from the above-described ground. Examples of the attribute of the ground surface include concrete, water, trees, soil, grass, and roads.

For example, it is determined that concrete, soil, and grass are suitable for landing, while water, trees, and roads are not suitable for landing. Moreover, the attribute of the ground surface is estimated from a semantic segmentation model α learned in advance. Semantic segmentation is a method of categorizing each pixel (pixel) in an image on the basis of information of surrounding pixels. The semantic segmentation model α is a learned model in which, for example, an RGB image included in the first sensing information is taken as input and an attribute value of each pixel in the RGB image is taken as output. Such an attribute value is a value indicating the attribute of the ground surface, and is different for each attribute of the ground surface.

Figure 5:
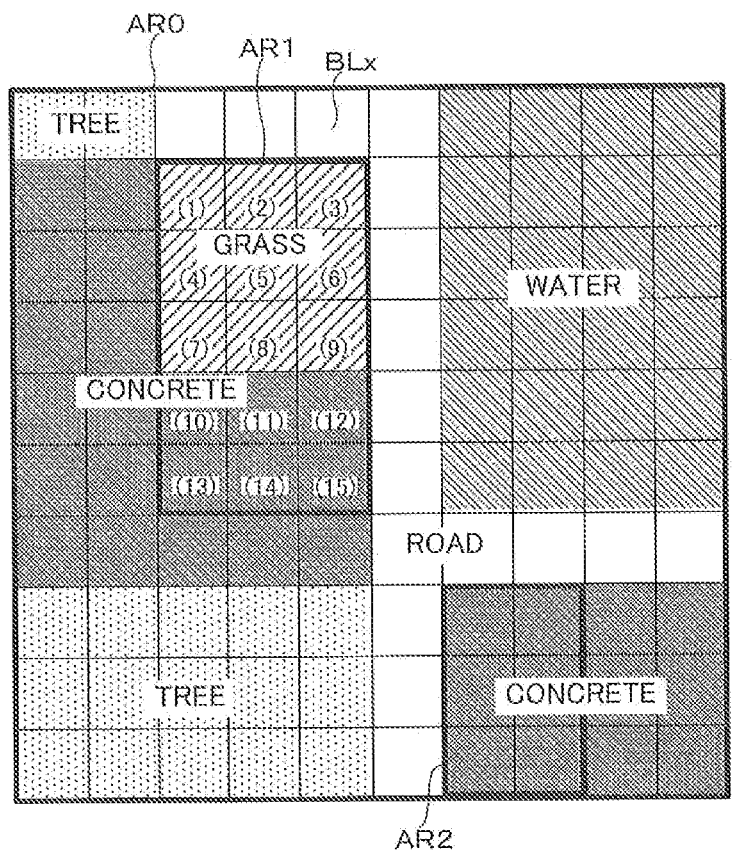
FIG. 5 is a conceptual diagram illustrating an example of a landing target area AR0 and landing candidate areas AR1 and AR2.

FIG. 5 is a conceptual diagram illustrating an example of a landing target area AR0 and landing candidate areas AR1 and AR2. Incidentally, in the example of FIG. 5, a three-dimensional shape of the landing target area AR0 is omitted. In the example of FIG. 5, the landing target area AR0 is virtually subdivided into sections BLx (an example of a predetermined second section) corresponding to a two-dimensional size (for example, length 5 m×width 5 m) necessary for the landing of the UAV 1, and the attributes (in this example, concrete, grass, water, trees, and roads) of the ground surface of the respective sections BLx are represented by different patterns. Here, each section BLx may have a rectangular, circular, or elliptical shape. In a case of using the semantic segmentation model α, for example, an attribute having the highest appearance frequency among the attributes of the ground surface associated with the pixels included in one section BLx is set as the attribute of the ground surface in the section BLx. By representing the attribute of the ground surface for each section BLx as described above, it is possible to reduce the occurrence of noise at the time of identifying the attribute of the ground surface. In the example of FIG. 5, the two landing candidate areas AR1 and AR2 having a range narrower than the landing target area AR0 are identified from the landing target area AR0. In a case where the plurality of landing candidate areas AR1 and AR2 are identified as described above, the landing candidate area AR1 having a wider range is preferentially used in the subsequent processing in consideration of connectivity.

Incidentally, on the basis of the first sensing information acquired by the sensing information acquisition unit 231, the landing candidate area identification unit 232 may identify, as the landing candidate area, the flat area having no obstacle and the predetermined size or more, and further having a wind speed included in the first sensing information equal to or less than a threshold from the landing target area. As a result, an area having flatness necessary for landing and where the wind is low in the landing target area can be identified as the landing candidate area.

The landing candidate place identification unit 233 identifies one or a plurality of landing candidate places of the UAV 1 from the landing candidate area identified by the landing candidate area identification unit 232. Here, a two-dimensional size of the landing candidate place of the UAV 1 is the two-dimensional size (equal to or larger than the vehicle size of the UAV 1) necessary for the landing of the UAV 1. For example, as illustrated in FIG. 5, the sections BLx obtained by virtually subdividing the landing candidate area AR1 are identified as landing candidate places (1) to (15) of the UAV 1. As a result, a landing candidate place (any one of (1) to (15)) that is relatively less affected by the downwardly-blowing wind hitting and bouncing off the feature can be selected as the landing place from the landing candidate area AR1.

On the basis of the second sensing information acquired by the sensing information acquisition unit 231, the feature identification unit 234 detects feature(s) (i.e., one or more features) existing in the peripheral area of the landing candidate place, and identifies the attribute(s) of the feature(s) (which may be the material(s) of the feature(s)). At this time, at least any one of the three-dimensional size(s) of the feature(s) and three-dimensional shape(s) of the feature(s) may be identified (e.g., at least one selected from the three-dimensional size and three-dimensional shape may be identified). Here, the periphery of the landing candidate place is desirably the surrounding of the landing candidate place (for example, in all surrounding directions or the four surrounding directions), but may be any direction in the periphery of the landing candidate place (only the feature(s) existing in any one direction may be detected). For example, the feature identification unit 234 can identify the attribute(s) of the feature(s) existing in the peripheral area of the landing candidate place by image analysis using data indicating relationships between an appearance characteristic of feature(s) and attribute(s) of the feature(s). Incidentally, the three-dimensional size(s) and the three-dimensional shape(s) of the feature(s) can be identified, for example, by performing SLAM processing on the second sensing information. Moreover, in a case where the plurality of landing candidate places are identified by the landing candidate place identification unit 233, the feature(s) in the peripheral area of each landing candidate place is(are) detected, and the attribute(s) of the feature(s) and at least any one of the three-dimensional size(s) and the three-dimensional shape(s) of the feature(s) are identified. That is, the attribute(s) of the feature(s) and the three-dimensional size(s) are identified, or the attribute(s) of the feature(s) and the three-dimensional shape(s) of the feature(s) are identified, or the attribute(s) of the feature(s), the three-dimensional size(s) and the three-dimensional shape(s) of the feature(s) are identified.

Moreover, the attribute(s) of the feature(s) may be identified (estimated) from a semantic segmentation model β learned in advance. In this case, the feature identification unit 234 detects the feature(s) existing in the peripheral area of the landing candidate place and identifies the attribute(s) of the feature(s) using the semantic segmentation model β. For example, the feature(s) is(are) detected by inputting an RGB image included in the second sensing information to the semantic segmentation model β, and an attribute value of each pixel of the RGB image is output from the semantic segmentation model β. Such an attribute value is a value indicating the attribute of the feature, and is different for each attribute of the feature. A plurality of adjacent pixels having the same attribute value together constitute one feature. By using the semantic segmentation model β, the attributes of the features existing in the peripheral areas of the plurality of landing candidate places can be identified at a time. Incidentally, by inputting not only the RGB image but also a depth image and a thermo image to the semantic segmentation model β, the accuracy of estimating the feature can be improved. Moreover, in addition to the image such as the RGB image included in the second sensing information, the image such as the RGB image included in the first sensing information may be input to the semantic segmentation model β.

Figure 6:
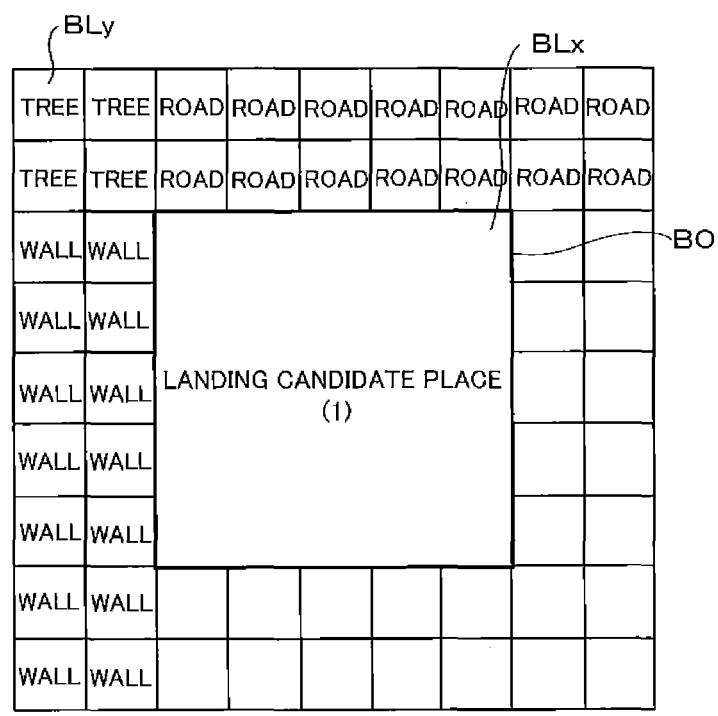
FIG. 6 is a conceptual diagram illustrating an example of attributes of features existing in a peripheral area of a landing candidate place (1).

FIG. 6 is a conceptual diagram illustrating an example of attributes of features existing in the peripheral area of the landing candidate place (1). In the example of FIG. 6, the periphery of the landing candidate place (1) is virtually subdivided into sections BLy (an example of a predetermined first section), and the attribute of the feature is indicated in each section BLy in which the feature is detected. However, the attribute of the feature is not indicated in the section BLy in which no feature is detected. Here, the section BLy may have a rectangular, circular, or elliptical shape. Moreover, the section BLy may have a smaller size than that in the drawing. The smaller the size of the section BLy, the higher the accuracy of identifying the attribute. On the other hand, by identifying the attribute of the feature for each section BLy having a certain size as illustrated in FIG. 6, it is possible to reduce the occurrence of noise at the time of identifying the attribute. Incidentally, in the example of FIG. 6, the size (for example, length 1 m× width 1 m) of the section BLy is smaller than the size (for example, length 5 m×width 5 m) of the section BLx. However, the size of the section BLy and the size of the section BLx may be the same. Moreover, in the example of FIG. 6, the peripheral area of the landing candidate place (1) falls within a range of a distance (for example, 2 m) corresponding to two sections BLy outward from a boundary BO of the landing candidate place (1). However, the range is not particularly limited, and may be a narrower range (for example, one section BLy) or a wider range (for example, three sections BLy).

The influence degree estimation unit 235 estimates a degree of influence on the landing due to the downwardly-blowing wind generated during the landing of the UAV 1, hitting and bouncing off the feature(s). Such a degree of influence is a degree of influence at the landing candidate place (that is, a degree of influence on the landing at the landing candidate place), and is, for example, a value representing the degree of this influence. In a case where the plurality of landing candidate places are identified, the degree of influence is estimated for each of the landing candidate places. Incidentally, the degree of influence on the landing at the landing candidate place can also be referred to as landing suitability at the landing candidate place. For example, as the degree of influence on the landing at the landing candidate place is greater (higher), the landing control at the landing candidate place becomes more difficult, and thus the landing suitability is smaller (lower).

As a preferable example, the influence degree estimation unit 235 estimates the degree of influence on the landing at the landing candidate place on the basis of data indicating relationships between feature attributes and a corresponding ease(s) of airflow of the feature(s), and the attribute(s) of the feature(s) detected by the feature identification unit 234. As a result, it is possible to more efficiently estimate a degree of influence on landing at a landing candidate place. Here, the ease of airflow is represented by a numerical value, and the numerical value is set to be higher as the airflow is easier. FIG. 7 is a table-format diagram illustrating an example of data indicating relationships between feature attributes and a corresponding ease of airflow of the feature. In the example of FIG. 7, the ease of airflow is set to "0" points for a wall (building wall), the ease of airflow is set to "5" points for a tree, and the ease of airflow is set to "10" points, which is a maximum value, for a road. The ease of airflow of each feature (alternatively, one feature) existing in the peripheral area of the landing candidate place is identified. The greater the total sum of the identified eases of airflow, the smaller the degree of influence is calculated. Incidentally, in the example of FIG. 7, the attribute of the feature is classified into a wall (building wall), a wire mesh fence, a barrier, a tree, an article, a moving body, rubble, and a road. However, the attributes described here may be classified more finely, and the ease of airflow may be set for each classified attribute. For example, the article, the moving body, and the rubble may be classified into large, medium, and small depending on the size.

FIG. 8 is a conceptual diagram illustrating an example of the eases of airflow of the features existing in the peripheral area of the landing candidate place (1). In the example of FIG. 8, similarly to FIG. 6, the periphery of the landing candidate place (1) is virtually subdivided into the sections BLy, and the ease of airflow of the feature is indicated in each section BLy. Incidentally, in the section BLy in which no feature is detected, a point is determined, for example, according to setting by a user or a system administrator. FIG. 8 illustrates an example in which the user sets "10" points, which is the maximum value, of the ease of airflow. In the example of FIG. 8, the ease of airflow of the feature is identified for each section BLy, and the degree of influence on the landing at the landing candidate place (1) is estimated on the basis of the ease of airflow of each section BLy. For example, the reciprocal of the total sum of the eases of airflow is calculated as the degree of influence at the landing candidate place (1). The smaller the size of the section BLy, the higher the accuracy of identifying the ease of airflow. On the other hand, by identifying the ease of airflow for each section BLy having a certain size as illustrated in FIG. 8, it is possible to reduce the occurrence of noise at the time of identifying the ease of airflow. As a result, it is possible to improve the accuracy of estimating the degree of influence on the landing at the landing candidate place (1). Incidentally, the ease of airflow of each section BLy may be identified in consideration of a wind speed and a wind direction included in the second sensing information. For example, the ease of airflow identified on the basis of the attribute of the feature is corrected according to the wind speed and the wind direction in the section BLy where the feature exists. For example, the ease of airflow is corrected to be smaller as the wind blowing toward the landing candidate place (1) is stronger.

Moreover, the features having the same attribute may have different eases of airflow depending on the three-dimensional sizes and three-dimensional shapes of the features. Therefore, the influence degree estimation unit 235 may estimate the degree of influence on the landing at the landing candidate place on the basis of at least any one of the three-dimensional size(s) and the three-dimensional shape (s) of the feature(s) detected by the feature identification unit 234 in addition to the attribute(s) of the feature(s) detected by the feature identification unit 234. As a result, the accuracy of estimating the degree of influence on the landing at the landing candidate place can be improved. For example, the ease(s) of airflow identified on the basis of the attribute(s) of the feature(s) is(are) corrected according to the three-dimensional size(s) of the feature(s). The greater the total sum of the corrected eases of airflow, the smaller the degree of influence is calculated. For example, the ease of airflow is corrected to be smaller as the feature has a greater height. Moreover, the ease(s) of airflow identified on the basis of the attribute(s) of the feature(s) is(are) corrected according to the three-dimensional shape(s) of the feature(s). The greater the total sum of the corrected eases of airflow, the smaller the degree of influence is calculated. For example, the ease of airflow is corrected to be greater as the feature has a greater roundness (curvature).

Incidentally, the influence degree estimation unit 235 may estimate the degree of influence on the landing at the landing candidate place on the basis of data indicating relationships between feature attributes and a corresponding difficulty(s) of airflow of the feature, and the attribute(s) of the feature(s)

detected by the feature identification unit 234. Here, the difficulty of airflow is represented by a numerical value, and the numerical value is set to be higher as the airflow is more difficult. For example, in the data indicating the relationships between feature attributes and the corresponding difficulty of airflow of the feature, the difficulty of airflow is set to "10" points for a wall, the difficulty of airflow is set to "5" points for a tree, and the difficulty of airflow is set to "0" points for a road. The difficulty of airflow of each feature (alternatively, one feature) existing in the peripheral area of the landing candidate place is identified. The greater the total sum of the identified difficulties of airflow, the greater the degree of influence is calculated. In this case, in the example of FIG. 8, the difficulty of airflow of the feature is identified for each section BLy, and the degree of influence on the landing at the landing candidate place (1) is estimated on the basis of the difficulty of airflow of each section BLy. For example, the total sum of the difficulties of airflow is calculated as the degree of influence at the landing candidate place (1).

Incidentally, the difficulty of airflow of each section BLy may be identified in consideration of the wind speed and the wind direction included in the second sensing information. For example, the difficulty of airflow identified on the basis of the attribute of the feature is corrected according to the wind speed and the wind direction in the section BLy where the feature exists. For example, the difficulty of airflow is corrected to be greater as the wind blowing toward the landing candidate place (1) is stronger.

Moreover, in the case of using the difficulty of airflow of the feature, similarly to the ease of airflow, the influence degree estimation unit 235 may estimate the degree of influence on the landing at the landing candidate place on the basis of at least any one of the three-dimensional size(s) and the three-dimensional shape(s) of the feature(s) detected by the feature identification unit 234 in addition to the attribute(s) of the feature(s) detected by the feature identification unit 234. For example, the difficulty(ies) of airflow identified on the basis of the attribute(s) of the feature(s) is(are) corrected according to the three-dimensional size(s) of the feature(s). The greater the total sum of the corrected difficulties of airflow, the greater the degree of influence is calculated. For example, the difficulty of airflow is corrected to be greater as the feature has a greater height. Moreover, the difficulty(ies) of airflow identified on the basis of the attribute(s) of the feature(s) is(are) corrected according to the three-dimensional shape(s) of the feature(s). The greater the total sum of the corrected difficulties of airflow, the greater the degree of influence is calculated. For example, the difficulty of airflow is corrected to be smaller as the feature has a greater roundness (curvature).

Incidentally, the data indicating the relationships between feature attributes and the corresponding ease of airflow (or the corresponding difficulty of airflow) of the feature may be data indicating relationships between the feature attributes and the degree of influence according to the ease of airflow (or the difficulty of airflow) of the feature. In this case, relationships between the ease of airflow (or the difficulty of airflow) of the feature and the degree of influence is set in advance. The degree of influence corresponding to the attribute of the feature detected by the feature identification unit 234 is estimated from the data, as the degree of influence on the landing at the landing candidate place.

The landing suitability determination unit 236 determines whether or not the landing candidate place is suitable for landing on the basis of the degree of influence estimated by the influence degree estimation unit 235. For example, in a case where the degree of influence is less than a threshold (in other words, the landing suitability is high), it is determined that the landing candidate place is suitable for landing. On the other hand, in a case where the degree of influence is equal to or more than the threshold (in other words, the landing suitability is low), it is determined that the landing candidate place is not suitable for landing. Moreover, in a case where the influence degree estimation unit 235 estimates the degree of influence of each of the plurality of landing candidate places, the landing suitability determination unit 236 determines whether or not each landing candidate place is suitable for landing on the basis of the degree of influence of each landing candidate place.

The landing place selection unit 237 selects the landing candidate place determined to be suitable for landing by the landing suitability determination unit 236 as the landing place of the UAV 1. Incidentally, in a case where there are a plurality of landing candidate places determined to be suitable for landing, for example, a landing candidate place having the smallest degree of influence (in other words, having the highest landing suitability) estimated by the influence degree estimation unit 235 is selected as the landing place from among the landing candidate places. As a result, it is possible to select, as the landing place, a more suitable landing candidate place from among a plurality of the landing candidate places. Alternatively, among the plurality of landing candidate places determined to be suitable for landing, a landing candidate place selected by a user who uses the UAV 1 (for example, an operator who remotely controls the UAV 1) may be selected as the landing place.

The information provision unit 238 provides (transmits) the landing target area information to the UAV 1 via the communication unit 21. Moreover, the information provision unit 238 provides the landing candidate area information indicating the landing candidate area identified by the landing candidate area identification unit 232 to the UAV 1 via the communication unit 21. Moreover, the information provision unit 238 provides the landing place information indicating the landing place selected by the landing place selection unit 237 to the UAV 1 via the communication unit 21.

[2. Operation of Flight Management System S]

Figure 9:
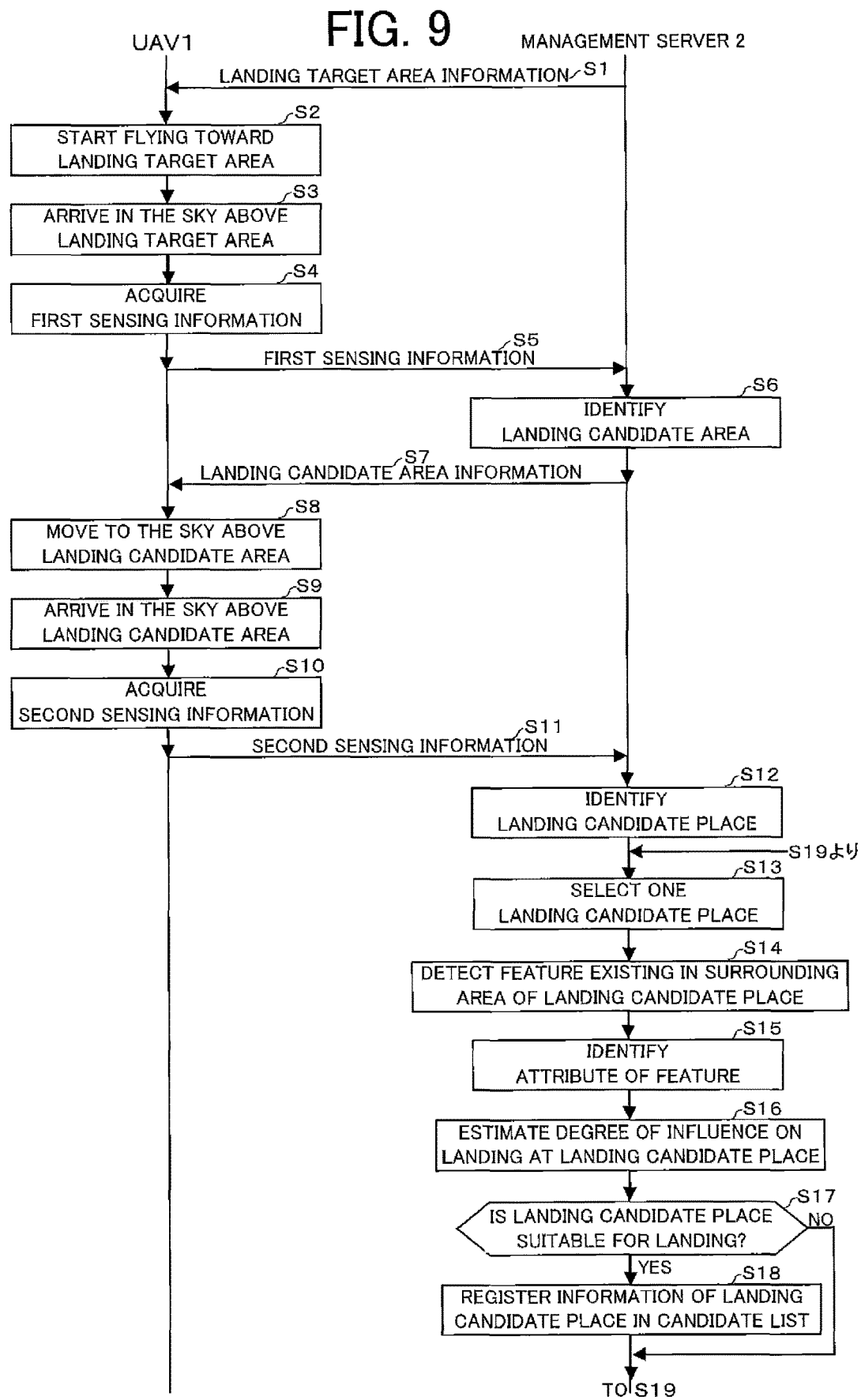
FIG. 9 is sequence diagrams illustrating an example of processing executed between the UAV 1 and the management server 2 in the flight management system S.
Figure 10:
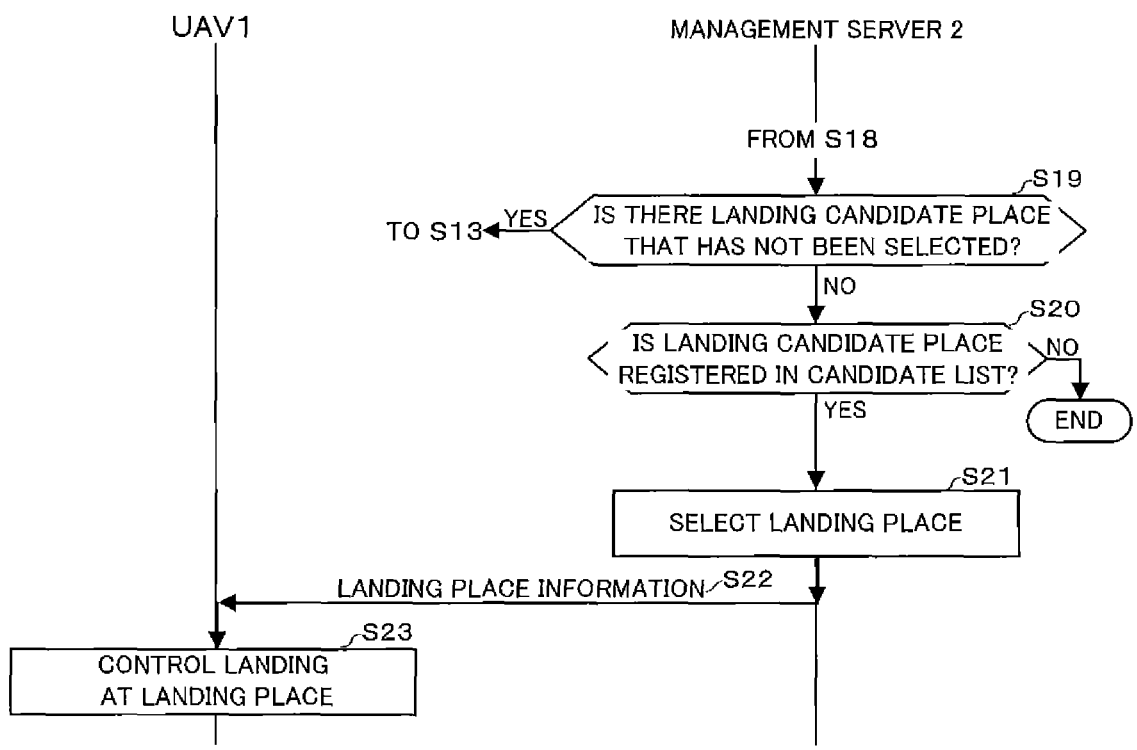
FIG. 10 is sequence diagrams illustrating an example of processing executed between the UAV 1 and the management server 2 in the flight management system S.

Next, an operation of the flight management system S will be described with reference to FIGS. 9 and 10. FIGS. 9 and 10 are sequence diagrams illustrating an example of processing executed between the UAV 1 and the management server 2 in the flight management system S. In FIG. 9, the management server 2 transmits the landing target area information including a sensing command of the landing target area to the UAV 1 via the communication network NW (step S1).

Next, upon acquiring (receiving) the landing target area information from the management server 2, the UAV 1 starts flying from the departure point toward the landing target area (step S2). Subsequently, when arriving in the sky above the landing target area (for example, an altitude of 30 m) (step S3), the UAV 1 activates the sensor unit 14 to start sensing the range including the landing target area, and acquires the first sensing information obtained by the sensing (step S4). Such sensing may be continuously performed while the UAV 1 is moving, or may be continuously performed while the UAV 1 is hovering. The UAV 1 then transmits the first sensing information acquired at step S4 and the vehicle ID of the UAV 1 to the management server 2 via the communication network NW (step S5).

Next, when acquiring the first sensing information and the vehicle ID from the UAV 1 by the sensing information acquisition unit 231, the management server 2 causes the landing candidate area identification unit 232 to identify the landing candidate area from the landing target area on the basis of the first sensing information (step S6). Subsequently, the management server 2 transmits the landing candidate area information including a sensing command of the landing candidate area identified at step S6 to the UAV 1 via the communication network NW (step S7).

Next, when acquiring the landing candidate area information from the management server 2, the UAV 1 moves to the sky above the landing candidate area while lowering the altitude (step S8). Subsequently, when arriving in the sky above the landing candidate area (for example, an altitude of 10 m) (step S9), the UAV 1 activates the sensor unit 14 to starts sensing the range including the landing candidate area, and acquires the second sensing information obtained by the sensing (step S10). Such sensing may be continuously performed while the UAV 1 is moving, or may be continuously performed while the UAV 1 is hovering. The UAV 1 then transmits the second sensing information acquired at step S10 and the vehicle ID of the UAV 1 to the management server 2 via the communication network NW (step S11).

Next, when acquiring the second sensing information and the vehicle ID from the UAV 1 by the sensing information acquisition unit 231, the management server 2 causes the landing candidate place identification unit 233 to identify the landing candidate places having the two-dimensional size necessary for the landing of the UAV 1 (step S12). Incidentally, the two-dimensional size necessary for the landing of the UAV 1 is set on the basis of the vehicle size associated with the vehicle ID of the UAV 1 in the flight management database 221. The management server 2 then selects one landing candidate place identified at step S12 (step S13).

Next, the management server 2 causes the feature identification unit 234 to detect the feature existing in the peripheral area of the landing candidate place selected at step S13 on the basis of the acquired second sensing information (step S14). Subsequently, the management server 2 causes the feature identification unit 234 to identify the attribute of the feature detected at step S14 (step S15). At this time, at least any one of the three-dimensional size and the three-dimensional shape of the feature detected at step S14 may be identified.

Next, the management server 2 causes the influence degree estimation unit 235 to estimate the degree of influence on the landing at the landing candidate place selected at step S13 (step S16). For example, the influence degree estimation unit 235 refers to the data indicating the relationships between feature attributes and the corresponding ease of airflow (or the corresponding difficulty of airflow) of the feature to identify the ease of airflow (or the difficulty of airflow) associated with the attribute of the feature identified at step S15, and estimates the degree of influence on the landing at the landing candidate place selected at step S13 using a predetermined calculation formula on the basis of the identified ease of airflow (or difficulty of airflow). The degree of influence estimated in this manner is stored in association with the landing candidate place.

Incidentally, in a case where the plurality of features are detected in the peripheral area of the landing candidate place selected at step S13, the eases of airflow (or the difficulties of airflow) of each feature are added up, so that the degree of influence on the landing at the landing candidate place is estimated. Furthermore, the influence degree estimation unit 235 may estimate the degree of influence on the landing at the landing candidate place on the basis of at least any one of the three-dimensional size(s) and the three-dimensional shape(s) of the feature(s) identified at step S15 in addition to the attribute(s) of the feature(s) identified at step S15.

Next, the management server 2 causes the landing suitability determination unit 236 to determine whether or not the landing candidate place selected at step S13 is suitable for landing on the basis of the degree of influence estimated at step S16 (step S17). In a case where it is determined that the landing candidate place is suitable for landing (step S17: YES), information of the landing candidate place (for example, the position and the two-dimensional size) is registered in a candidate list (step S18), and the processing proceeds to step S19. On the other hand, in a case where it is determined that the landing candidate place is not suitable for landing (step S17: NO), the processing proceeds to step S19.

Next, at step S19 illustrated in FIG. 10, the management server 2 determines whether or not there is a landing candidate place that has not yet been selected among the landing candidate places identified at step S12. In a case where it is determined that there is a landing candidate place that has not yet been selected (step S19: YES), the processing returns to step S13, the landing candidate place that has not yet been selected is selected, and the processing of step S14 is performed in the same manner as described above. On the other hand, in a case where it is determined that there is no landing candidate place that has not yet been selected (step S19: NO), the processing proceeds to step S20.

At step S20, the management server 2 determines whether or not the landing candidate place is registered in the candidate list. In a case where it is determined that no landing candidate place is registered in the candidate list (step S20: NO), the processing ends. In this case, for example, another landing candidate area may be identified, and the same processing as described above may be performed. On the other hand, in a case where it is determined that the landing candidate place is registered in the candidate list (step S20: YES), the processing proceeds to step S21.

At step S21, the management server 2 causes the landing place selection unit 237 to select the landing place of the UAV 1 from among the landing candidate place(s) registered in the candidate list. For example, in a case where one landing candidate place is registered in the candidate list, the landing candidate place is set as the landing place of the UAV 1. On the other hand, for example, in a case where the plurality of landing candidate places are registered in the candidate list, the landing candidate place having the smallest degree of influence estimated at step S16 is selected as the landing place of the UAV 1 among the plurality of landing candidate places.

Incidentally, the management server 2 may transmit three-dimensional map data indicating the positions of the plurality of landing candidate places registered in the candidate list and the features existing in their peripheral areas to a terminal of the user who uses the UAV 1 (for example, the operator who remotely controls the UAV 1). In this case, a three-dimensional map indicating the positions of the plurality of landing candidate places registered in the candidate list and the features existing in their peripheral areas is displayed on the terminal of the user. When a desired landing candidate place among the plurality of landing candidate places indicated in the three-dimensional map is designated by the user, information indicating the designated landing candidate place is transmitted from the terminal of the user to the management server 2. The landing place selection unit 237 selects the landing candidate place designated by the user, as the landing place of the UAV 1.

Next, the management server 2 transmits the landing place information indicating the landing place selected at step S21 to the UAV 1 via the communication network NW (step S22). Incidentally, at step S21, the management server 2 may set the feature detected at step S14 as the obstacle and determine the landing method according to the arrangement of the obstacle. In this case, the management server 2 transmits the landing method information indicating the determined landing method to the UAV 1 via the communication network NW together with the above-described landing place information.

Next, when acquiring the landing place information from the management server 2, the UAV 1 controls the landing at the landing place indicated by the landing place information (step S23). Incidentally, in a case where the UAV 1 acquires the landing method information together with the landing place information from the management server 2, the UAV 1 performs the landing control by the landing method according to the arrangement of the obstacle in the peripheral area of the landing place indicated by the landing place information. Thereafter, the UAV 1 returns to the departure point, for example.

As described above, according to the above embodiment, the management server 2 detects the feature(s) existing in the peripheral area of the landing candidate place of the UAV 1, estimates the degree of influence on the landing due to the downwardly-blowing wind generated during the landing of the UAV 1, hitting and bouncing off the feature(s), which is the degree of influence at the landing candidate place, and determines whether or not the landing candidate place is suitable for landing on the basis of the estimated degree of influence. Therefore, it is possible to select the suitable landing place (that is, the landing place less affected by the downwash) in consideration of the influence of the downwardly-blowing wind hitting and bouncing off the feature(s). That is, even in a case where the landing candidate place is surrounded by the features at a short distance from the features, the place can be selected as the landing place as long as the place is less affected by the downwash. For example, in contrast to a conventional case where the UAV 1 cannot land due to a short distance from the feature, the present embodiment enables determination that landing is possible when the feature is well ventilated such as a tree and a wire mesh, and that landing is possible even when the two-dimensional size of the landing candidate place is small. Furthermore, according to the above embodiment, even in a case where the features exist in the landing target area, it is possible to select a suitable landing plan in addition to the safer landing place.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the management server 2 is configured to detect the feature(s) existing in the peripheral area of the landing candidate place of the UAV 1, estimate the degree of influence on the landing due to the downwardly-blowing wind generated during the landing of the UAV 1, hitting and bouncing off the feature(s), and determine whether or not the landing candidate place is suitable for landing on the basis of the estimated degree of influence. However, such processing may be performed by the UAV 1. In this case, the control unit 16 of the UAV 1 functions as the landing candidate area identification unit 232, the landing candidate place identification unit 233, the feature identification unit 234, the influence degree estimation unit 235, the landing suitability determination unit 236, and the landing place selection unit 237 described above, and the control unit 16 performs the processing of steps S6 and S12 to S18 illustrated in FIG. 9 and steps S19 to S21 illustrated in FIG. 10. Moreover, in this case, the semantic segmentation model α and the semantic segmentation model β described above may be stored in the storage unit 15 in advance.

Moreover, in the above embodiment, the UAV 1 scheduled to land is configured to fly and perform the sensing of the range including the landing target area and the range including the landing candidate area, so that the sensing information obtained by the sensing immediately before the landing of the UAV 1 is used. Therefore, the accuracy of estimating the degree of influence on the landing at the landing candidate place can be improved. However, such sensing may be performed in advance (for example, before the UAV 1 starts flying) by a flight vehicle other than the UAV 1 scheduled to land. In this case, the first sensing information is stored in the database in association with the landing target area information, the second sensing information is stored in the database in association with the landing candidate area information, and the first sensing information and the second sensing information are acquired from the database by the management server 2 or the UAV 1. Moreover, in the above embodiment, the UAV has been described as an example of the unmanned aerial vehicle, but the present invention is also applicable to a flying robot or the like other than the UAV.

REFERENCE SIGNS LIST

1 UAV
2 Management server
11 Drive unit
12 Positioning unit
13 Communication unit
14 Sensor unit
15 Storage unit
16 Control unit
21 Communication unit
22 Storage unit
23 Control unit
231 Sensing information acquisition unit
232 Landing candidate area identification unit
233 Landing candidate place identification unit
234 Feature identification unit
235 Influence degree estimation unit
236 Landing suitability determination unit
237 Landing place selection unit
238 Information provision unit
S Flight Management system

What is claimed is:

1. An information processing device comprising:
   at least one memory configured to store program code; and at least one processor configured to access the program code and operate as instructed by the program code, the program code including:
   detection code configured to cause the at least one processor to detect, based on a semantic segmentation model trained to output a plurality of attribute values of a plurality of pixels in an input image, one or more features in a captured image of a peripheral area of a landing candidate place of an unmanned aerial vehicle, wherein the one or more features correspond to objects in contact with the ground;

estimation code configured to cause the at least one processor to calculate an estimated degree of influence on landing at the landing candidate place, wherein the estimated degree of influence is a sum of one or more numeric values corresponding to an ease or difficulty of airflow on landing with respect to downwardly-blowing wind hitting and bouncing off the one or more features;

determination code configured to cause the at least one processor to determine, based on the estimated degree of influence, whether the unmanned aerial vehicle is to land in the landing candidate place; and landing code configured to cause at least one of the at least one processor to, based on selecting the landing candidate place as a landing place, controlling the unmanned aerial vehicle to land at the landing place.

2. The information processing device according to claim 1, wherein the estimation code causes the at least one processor to calculate the estimated degree of influence based on data indicating relationships between feature attributes and a corresponding ease or difficulty of airflow of a feature; and an attribute of the feature.

3. The information processing device according to claim 2, wherein the estimation code causes the at least one processor to identify the ease or the difficulty of airflow of the feature for each of a plurality of first sections obtained by virtually subdividing the peripheral area of the landing candidate place, and to calculate the estimated degree of influence based on the ease or the difficulty of airflow of each section.

4. The information processing device according to claim 2, wherein the estimation code causes the at least one processor to calculate the estimated degree of influence based on at least any one of a three-dimensional size and a three-dimensional shape of the feature, in addition to the attribute of the detected feature.

5. The information processing device according to claim 1, wherein the landing candidate place is a place obtained by virtually subdividing a landing candidate area into predetermined second sections.

6. The information processing device according to claim 5, wherein
the estimation code causes the at least one processor to calculate the estimated degree of influence for each of a plurality of landing candidate places, and
the determination code causes the at least one processor to determine whether the unmanned aerial vehicle is to land in one from among the plurality of landing candidate places based on the estimated degree of influence of each of the plurality of landing candidate places.

7. The information processing device according to claim 5, the program code further including identification code configured to cause the at least one processor to identify, as the landing candidate area, a flat area having at least no obstacle and a predetermined size or more from a predetermined landing target area.

8. The information processing device according to claim 5, the program code further including identification code configured to cause the at least one processor to identify, as the landing candidate area a flat area greater than or equal to a predetermined size comprising:

no obstacles and an attribute of a ground surface determined suitable for landing from a predetermined landing target area.

9. The information processing device according to claim 1, wherein the detection code causes the at least one processor to detect the one or more features based on information relating to the peripheral area of the landing candidate place that is obtained from a sensor of the unmanned aerial vehicle.

10. A landing suitability determining method executed by one or a plurality of computers, the landing suitability determining method comprising:

detecting, based on a semantic segmentation model trained to output a plurality of attribute values of a plurality of pixels in an input image, one or more features in a captured image of a peripheral area of a landing candidate place of an unmanned aerial vehicle, wherein the one or more features correspond to objects in contact with the ground;

calculating an estimated degree of influence on landing at the landing candidate place, wherein the estimated degree of influence is a sum of one or more numeric values representing an ease or difficulty of airflow on landing with respect to downwardly-blowing wind hitting and bouncing off the one or more features;

determining, based on the estimated degree of influence, whether the unmanned aerial vehicle is to land in the landing candidate place; and based on selecting the landing candidate place as a landing place, controlling the unmanned aerial vehicle to land at the landing place.

11. A non-transitory computer readable memory having stored thereon a program configured to cause a computer to:

detect, based on a semantic segmentation model trained to output a plurality of attribute values of a plurality of pixels in an input image, one or more features in a captured image of a peripheral area of a landing candidate place of an unmanned aerial vehicle, wherein the one or more features correspond to objects in contact with the ground;

calculate an estimated degree of influence on landing at the landing candidate place, wherein the estimated degree of influence is a sum of one or more numeric values representing an ease or difficulty of airflow on landing with respect to downwardly-blowing wind hitting and bouncing off the one or more features;

determine, based on the estimated degree of influence, whether the unmanned aerial vehicle is to land in the landing candidate place; and based on selecting the landing candidate place as a landing place, control the unmanned aerial vehicle to land at the landing place.

* * * * *